United States Patent [19]
Danco

[11] 3,921,146
[45] Nov. 18, 1975

[54] PROGRAMMABLE DATA PROCESSOR AND CONTROLLER SYSTEM

[75] Inventor: William J. Danco, Roanoke, Va.

[73] Assignee: General Electric Company, Salem, Va.

[22] Filed: June 17, 1974

[21] Appl. No.: 480,112

Related U.S. Application Data

[63] Continuation-in-part of Ser. No. 321,260, Jan. 5, 1973, abandoned.

[52] U.S. Cl. .......................................... 340/172.5
[51] Int. Cl.² ............................................ G06F 9/16
[58] Field of Search ............................... 340/172.5

[56] References Cited
UNITED STATES PATENTS

| | | | |
|---|---|---|---|
| 3,345,611 | 10/1967 | Eachus | 340/172.5 |
| 3,560,933 | 2/1971 | Schwartz | 340/172.5 |
| 3,651,484 | 3/1972 | Smeallie | 340/172.5 |
| 3,686,639 | 8/1972 | Fletcher et al. | 340/172.5 |
| 3,731,243 | 8/1973 | Shevlin | 340/172.5 |
| 3,753,236 | 8/1973 | Flynn et al. | 340/172.5 |
| 3,753,243 | 8/1973 | Ricketts, Jr. et al. | 340/172.5 |

OTHER PUBLICATIONS

Siebel et al, "Controlling Production Machines with Programmable Controllers" Automation, Feb. 1973, pp. 61–64.

Primary Examiner—Gareth D. Shaw
Assistant Examiner—Michael Sachs
Attorney, Agent, or Firm—Robert E. Brunson; Arnold E. Renner

[57] ABSTRACT

A data processor/controller contains a program representative of a logic configuration required to control the sequencing of operations in equipment external thereto. The processor/controller includes means for accumulating the results of a plurality of logic operations as specified by the program and providing a final result representative of conditions in the logic configuration. The final result has a condition which is used to control the external equipment.

8 Claims, 7 Drawing Figures

PROGRAMMABLE DATA PROCESSOR AND CONTROLLER SYSTEM

This is a continuation-in-part of application Ser. No. 321,260, filed Jan. 5, 1973, now abandoned.

BACKGROUND OF THE INVENTION

This invention relates generally to data processing systems and more particularly to programmable data processor and controller systems for controlling various types of electrical and electronic equipment. More specifically the invention is a related to a programmable processor/controller having a stored program simulative of the logic required to control the various types of equipment whereby means in the processor/controller accumulates the results of a plurality of logic operations performed and provides a final result for controlling the various types of equipment.

FIELD OF THE INVENTION

Digital computers have long been used in business, scientific and industrial process control applications. Typically, the computers are of a general purpose design and must be programmed for a particular application. Because of this general purpose design, the computers do not contain all of the logic circuitry required for all applications. As a result, it is necessary to replace this logic circuitry with extensive specialized programming techniques in order to use the computers in the various applications. This specialized programming of such computers, according to the prior art methods, is an extensive and large task requiring many man-hours of highly trained programmers. In addition, since many of the logic functions must be performed by the program a great deal of memory space is required, thus increasing the cost of the computer memory and the computer.

It is because of the previously described costs, that many potential users of the computer equipment have refrained from purchasing such equipment. The field of this invention reduces some of these costs by providing a data processor/controller including logic circuitry which simplifies the programming task while reducing the amount of memory space normally required for storing a program.

DESCRIPTION OF THE PRIOR ART

Many prior art computers have been programmed to simulate a process and function to provide control signals to the process which are calculated in response to monitored signals from the process and various stored constants inn the program. This type of program is usually very complex, does not resemble the process in any way and it must be written by a highly skilled programmer.

One known prior art general purpose computer system has attempted to alleviate these complex problems by being programmed in a special way to simulate a process whereby the program closely resembles the process. This latter general purpose computer system has many applications in small industrial control processes. Typical of these applications are the automatic control for: the manufacture of machine tools, assembly of equipment, plastic molding machinery, textile machinery, materials handling equipment, traffic control equipment, and the like.

The type of logic functions found in the industrial control systems of the above-cited type have been performed by relays and switches. The most common form of documentation used to define how the various relays and switches are interconnected to form the control logic for the system has been a schematic electrical diagram. In this one known prior art system, the electrical schematic diagram has been programmed into the computer to directly replace or simulate the schematic normally used to control the process. This form of schematic portrays two vertically spaced-apart power buses, each connected to the power source. A plurality of horizontal conductors are connected between the vertical buses to form what is commonly referred to as an electrical ladder type schematic or circuit diagram.

Each horizontal conductor terminates in a relay and each conductor has disposed therein series-connected switches or relay contacts for controlling the relay when continuity is established through the conductor. The series-connected switches and relay contacts correspond to a logical "AND" function. A logical "OR" function is provided by drawing into the schematic another conductor having switches or contacts therein whereby the conductor is connected at one end to a one of the horizontal conductors preceding its relay and connected at the other end to receive power from a one of the vertical buses.

The computer of this prior art system contains an executive program comprised of subroutines for simulating each of the functions required to control the system. One of these subroutines is a special purpose control program which communicates with part of the executive program and corresponds to the electrical circuit diagram of the industrial process to be controlled. The computer is connected to the process and controls the latter in accordance with the electrical diagram stored therein. This control program is placed in the memory in the form of control words. Each control word is representative of a particular type of relay contact which may be specified to have a condition of any relay coil in the system. Further, each of the control words contain a reference address to a relay coil which is utilized to control the condition of its associated referencing contact. For each conductor, a series of these control words is sequentially placed into memory such that a series execution of these control words will effect the closing or opening of these contacts which in turn will effect the operation of the relay terminating at the end of each conductor. For example, if a particular conductor contains four relay contacts and each relay contact is in the closed condition, continuity is established through the conductor, thus energizing the relay terminating at the end of the conducor. The state of this terminating relay is then utilized to generate an output control signal which is applied to the process for controlling the same.

Since this prior art system completely simulates the process in a general purpose computer containing no special hardware, every function to be performed must be directed by the computer program. Basically, this is accomplished by executing a control word in the control program to compare the state of the relay contact as specified by the control work with the state of its referencing relay to make a determination as to whether the contact should be closed or open. Based upon this comparison, a closed or open condition is stored into a table in the memory program for subsequent use. A series of these program control words is executed in this manner until the termination of a series string of switch contacts. Upon this termination, the computer program then branches to a special subroutine to selectively compare the results of each of the previous comparisons to make a determination as to whether the relay terminating at the end of the conductor should be energized or deenergized. Upon the completion of this special subroutine, a condition representative of the state of the terminating relay is then stored by the program to a particular output buffer in the computer memory for subsequent use for controlling the process.

In this prior art system there is a predetermined number of designated switches or relay contacts which must be placed in each conductor. That is, for each space in a conductor allocated to a contact, it is necessary to insert in the program a control word for a contact in that particular space. Even though no contact may exist in that space, it is still essential to place a control word in the program for that space. This imposes a severe limitation on the speed and memory space requirements of the program because it is necessary to execute a command for every single space required in a string even though that space does not require a relay contact. Because of this limitation, it is not practical to put more than a predetermined number of contacts in any given one conductor and the system is thus limited in that it can not have a variable length or string of series-connected contacts in any one conductor.

Additionally, this prior art system contains one other limitation for implementing an electrical ladder type diagram of the type described above. In many industrial control systems utilizing relay control logic there is frequently a single contactor on a bus which is permissive to control the operation of a number of the conductors connected to the bus. This permissive contact is utilized when it is desired to provide a plurality of output control signals simultaneously to the process; for example, to shut down a number of motors or open circuit breakers, etc. The prior art system does not incorporate this capability. As a result, memory space is consumed because this permissive contact must be contained in each of the conductors of the electrical ladder diagram. Therefore, it is desirable to provide a programmable data processor/controller for use in control applications which reduces the amount of storage space required for a program by eliminating many of the subroutines normally required for the execution of a control program.

SUMMARY OF THE INVENTION

The present invention overcomes these problems of the prior art by providing a programmable electronic control system having means to sequentially accumulate the status of a plurality of logic operations performed by the control system to generate a final result representative of the conducting status of a conductor in a ladder type diagram whereby the final result is utilized to selectively provide a control signal to external equipment or to effect control of a program stored within the system.

According to the invention, a programmable data processor including a store is provided for containing a program representative of a logic configuration to be simulated or performed by the computer for controlling a process. A logic configuration having the format of an electrical ladder diagram is stored in the computer store. Each conductor in the electrical ladder type diagram may comprise a variable number of electrical elements such as switches or relay contacts of an unrestricted number. A logic operator or control word of one type of information item is utilized to specify a particular type of operation to be performed and the condition of the electrical element to which the control word is related. The number of control words sequentially placed in the store represent the number of switches or relay contacts in any given single string of contacts associated with a one of the conductors in the electrical ladder type diagram. The termination of any given string of switch contacts is identified in the program by another control of a different type of information item word which effects the storing of a status condition representative of the conditions of each of the contacts in a given series connection to a location in the store as specified by the other control words.

Each of the control words contains an address which specifies a location in the store to retrieve therefrom a status condition representative of the state of a relay coil or condition associated with the relay contact of the control word referencing the status condition.

The data processor includes means for addressing the store to retrieve the control words therefrom. The control word is then placed in an instruction register which in turn generates operation code output signals and address signals to the store to address a location to retrieve the status condition from the store. This status condition is combined with the operation code signals in an accumulating means in the data processor wherein the status condition is compared with a condition as specified by the operation code signals. The accumulating means provides a final output status condition which is representative of a comparison between the status condition retrieved from the store, the operation code signals and the previous condition in the accumulating means. As each control word is sequencially retrieved from the store the accumulating means continues to sequentially accumulate the status of each of the individual contacts associated with the control word to generate a final output condition representative of the states of the contacts in each string in a single conductor. At the termination of each string of contacts, an instruction is retrieved from the store which directs the data processor to store the final status condition from the accumulating means into a location in the store as specified by an address field in the instruction. This final condition, which is a status condition representative of the state of a logic element such as a relay coil to be energized or deenergized, may be provided from the store to external equipment in the system as a control signal or it may be utilized within the data processor to control the status of other contacts within the electrical ladder control diagram.

The invention also provides the capability of placing a simulative permissive logic element or switch in a common bus which is common to a desired number of conductors in the electrical ladder diagram. By the execution of a particular command of an additional type of information item, inserted at the beginning of any string of logic in the control program, the status of this permissive contact may be stored in a storage means in the data processor which communicates with the accumulating means to control that means in the proper determination of the accumulation of the status of each of the switch contacts in the associated conductors.

Each string of logic is comprised of a plurality of control words and is always preceded by the control word for storing the condition of the permissive contact on the bus into the storage means in the data processor. Thus, the condition of the permissive contact, which is either open or closed, is utilized to determine whether simulated power should be applied to the conductor or conductors in the several strings of logic to either set or reset the relay terminating each of the conductors.

As will be seen, the combination of the stored electrical ladder diagram control program in combination with the accumulating means and the means for storing the status of the permissive contact provide the capability of executing the program much faster than in prior art systems. As a result, no subroutines are required in an executive program to effect the updating or accumulation of the status as in prior art systems. Thus, a great deal of memory storage space is saved.

It is, therefore, an object of the invention to provide a data processor/controller having enhanced operating capabilities.

Another object is to provide a computer controller utilizing a control program in combination with means for accumulating the status of a plurality of executions of control words in the program to generate a resultant status for subsequent use by the data processor.

Still another object of the invention is to provide a computer controller wherein a special purpose control program is cast in the form of a conventional schematic electrical circuit diagram.

A still further object of the invention is to provide a data processor/controller programmed to perform the functions of relay logic.

A further object of the invention is to provide a computer controller and a control system for communicating with a process to be controlled.

A still further object is to provide a data processor/controller including means for storing the status of a permissive contact related to a plurality of strings of logic stored in electrical ladder diagram form in the computer.

Yet a further object is to provide a computer controller having a special purpose control program to be executed by the computer controller to simulate the logic required to control a process external to the computer controller.

A still further object is to provide a control program in a digital computer cast in the form of a logic diagram for performing AND and OR functions in accordance with control words was specified in the program.

BRIEF DESCRIPTION OF THE DRAWING

The present invention may be more readily described and understood by reference to the accompanying drawing in which.

DESCRIPTION OF THE PREFERRED EMBODIMENT

Figure 1:
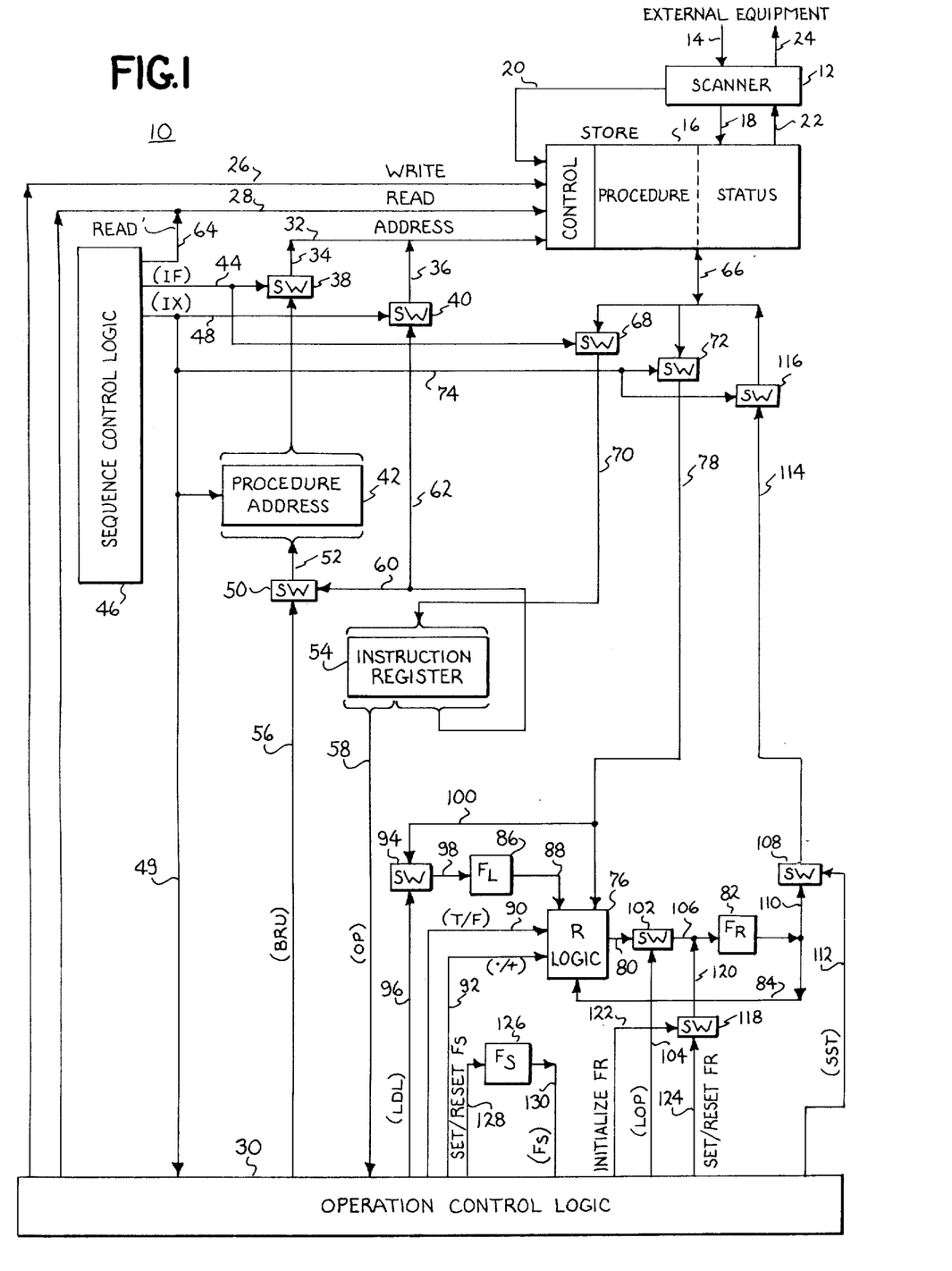
FIG. 1 is a block diagram of the system of the present invention showing the data processor incorporating the invention wherein the heavy lines represent data lines and the thin lines represent control lines.

Reference is now made to FIG. 1 which shows a data processor/controller system generally comprised of a data processor designated 10 and a scanner 12 which provides output control signals to and receives control signals from external equipment or a process not shown. The scanner 12 may be any one of the well-known types of scanners capable of being selectively enabled to sequentially scan a plurality of input signals provided thereto via conductors 14. The input signals are provided as input conditions from the scanner to a store 16 of the data processor via a plurality of conductors 18. The input conditions are placed in locations in the store in accordance to address signals provided to a control portion of the store 16 via address lines 20 connecting the scanner to the control portion.

Store 16 is preferably of a conventional type having nondestructive read-out with write-in capabilities. There are many such memories commercially available. One such memory is documented in detail in the publication "Ampex 1860 and 1865 Core Memory Modules - Technical Manual - 3265840-01," September 1972 by Ampex Computer Products Division, Marina Del Rey, California.

The scanner may also be enabled to selectively read various conditions or states from the store 16 from addressed locations specified on conductors 20 to provide output states or conditions to the scanner via conductors 22. These output conditions are provided as control signals to the external equipment on conductors 24 from the scanner.

The data processor store is segmented into three sections designated "procedure" and "status" and "control." The segmentation of the store is illustrated merely to simplify the ensuing description of the operation of the invention. The procedure portion of the store is utilized to contain the control program which simulates the logic structure of the external process to be controlled. The status section of the store is utilized to store status conditions or conditions representative of simulated relays, switches or relay contacts related to the external process. Certain ones of these status conditions are representative of the state of input signals provided to the store from the process and other ones of the status conditions are representative of output signals to be provided to the process. Additionally, status conditions may also be stored in this section of the store and used during the execution of the control program for performing various branch functions and for controlling the execution of certain phases of the control program. The control, which also comprises a portion of the store, is utilized to provide addressing signals to the store for storing and retrieving information. Signals for controlling the operation of the store are provided to the control on a write signal line 26 and a read signal line 28 from an operation control logic 30.

An address bus 32 is utilized to provide address information to the control for addressing the store in response to address information selectively provided to the bus via data lines 34 and 36 from two switches 38 and 40 respectively. A procedure address register 42 provides addressing and data information to switch 38 to address the store during an instruction fetch cycle of the data processor as specified by a signal designated (IF) on line 44 from a sequence control logic 46. During the execution of certain instructions to perform logic operations in the control program, the procedure address register sequentially addresses the store 16 in response to a count signal (IX) provided to the address register from the sequence control logic on line 48. The procedure address register, however, may also be parallel loaded with an address from a switch 50 via address lines 52. The address, which is provided to the procedure address register through switch 50, is an address specified by the execution of a BRU (Branch Unconditional) command.

All instructions retrieved from the store are placed in an instruction register 54. The instruction register is comprised basically of two portions, one containing the operation code which specifies a particular operation or the type of instruction and an address portion which specifies an address for the store to retrieve or store data. The BRU command when retrieved from the store contains and address which is provided from the instruction register 54 to switch 50 for parallel loading the procedure address register 42. Switch 50 is enabled by a (BRU) command signal on conductor 56 which signal is generated in the operation control logic 30 in response to the operation code information contained in the instruction register. The operation code contained in the instruction register 54 is provided in the form of signals on conductors 58 to the operation control logic 30. The instruction register provides addressing information via conductors 60 to switch 50 and addressing formation via data conductors 62 to switch 40. Switch 40 is enabled during the execution of an instruction (after the instruction fetch cycle) by a signal (IX) from the sequence control logic 46 on conductor 48.

To obtain an instruction for placement in the instruction register for execution by the data processor, the store is provided with a read signal on lines 64 and 28 from the sequence control logic 46 and an address via address bus 32. The instruction is read from the store and delivered via conductors 66, switch 68 and conductors 70 to the instruction register 54. It will be noted that the same signal (IF) which enables switch 38 also enables switch 68 to allow the instruction word being retrieved from the store to pass through switch 68 into the instruction register.

When a status bit is to be retrieved from the store, the read signal on conductor 28 and the address signal presented to the store control from switch 40 will cause the status bit to be retrieved and passed through a switch 72 in response to an enable signal (IX) on a conductor 74 from the sequence control logic. Each status bit retrieved from the store passes through switch 72 and is presented as an input to an R logic 76 via a plurality of data conductor 78. The R logic (R standing for result) is utilized to generate an output signal on a conductor 80 representative of a comparison result by the R logic. This output signal is generated in response to the comparison of the input data bit from switch 72, a previously stored or accumulated condition or bit from a result $F_R$ flip-flop 82 on a conductor 84 in combination with the condition of a left bus $F_L$ flip-flop 86 on conductor 88 whenever certain commands or words are being executed by the data processor. The enable signals for the R logic are provided on conductors 90 and 92 from the operation control logic 30.

As previously mentioned, the present invention provides the capability of storing the condition of a permissive relay contact or switch which is commonly related to a plurality of strings of logic in an electrical ladder diagram. The storage of this permissive bit is provided by the $F_L$ flip-flop 86 which receives input data to establish its condition from a switch 94 during the execution of a specified command. Switch 94 is enabled by a signal LDL on a conductor 96 from the operation control logic. The input signal to establish the state of the $F_L$ flip-flop is provided from switch 72 via conductors 78 and 100 to switch 94 and from that switch via conductor 98.

The output of the R logic 96 is delivered via conductor 80 to a switch 102 which is enabled by a signal (LOP) from the operation control logic 30 on a line 104. During the execution of specified commands by the data processor, switch 102 is enabled to pass the condition from the R logic into the $F_R$ flip-flop 82. Upon the enablment of switch 102 the state of $F_R$ is either changed or unchanged in accordance with the input signal provided thereto via a conductor 106. The $F_R$ flip-flop is utilized to accumulate or update the status of the contacts in a given string of logic in the electrical ladder diagram as simulated by the data processor. During the execution of the control program, the $F_R$ flip-flop sequentially accumulates the status of the contacts in a string of logic and upon the termination of a string provides a final resultant output condition to a switch 108 via conductor 110. A given string of logic is terminated by the execution of an instruction in the program which provides an enable signal (SST) from the operation control logic 30 on a conductor 112 to switch 108. Upon execution of this command switch 108 is enabled to thus provide the final resultant state of the $F_R$ flip-flop via a conductor 114 to a switch 116. SW 116 is enabled by the signal (IX) from the sequence control logic 46. This is a store operation and requires a write signal from the operation control logic which is provided to the control of the store to store the status bit from the $F_R$ flip-flop.

Still referring to FIG. 1, a switch 118 gates an initialization signal via a conductor 120 to the input of the $F_R$ flip-flop. Switch 118 receives an initialize $F_R$ signal on line 122 and set/reset $F_R$ control signals on lines 124 from the operation control logic. The purpose of this $F_R$ flip-flop input is to place that flip-flop in a predetermined state or condition upon the entrance of each string of logic by the control program. The data processor also includes an additional flip-flop 126 designated $F_S$. The $F_S$ flip-flop is utilized by the operation control logic to temporarily store the fact that a string of logic has been completed in the control program. The state of the $F_S$ flip-flop is also utilized by the operation control logic to control the enablement of switch 118 to control the state of the $F_R$ flip-flop. Inputs to the $F_S$ flip-flop are set/reset $F_S$ signals provided on lines 128. Its output ($F_S$) is on line 130.

The operation control logic may be structured from several types of integrated circuits such as LSI, MSI (large and medium scale integrated circuits), transistor transistor logic circuits commonly known as $T^2L$, etc. One type of logic circuits from which the operation control logic can be structured is shown in the publication "TTL Data Book for Design Engineers," First Edition, copyright 1973 by Texas Instruments Inc.

Figure 3:
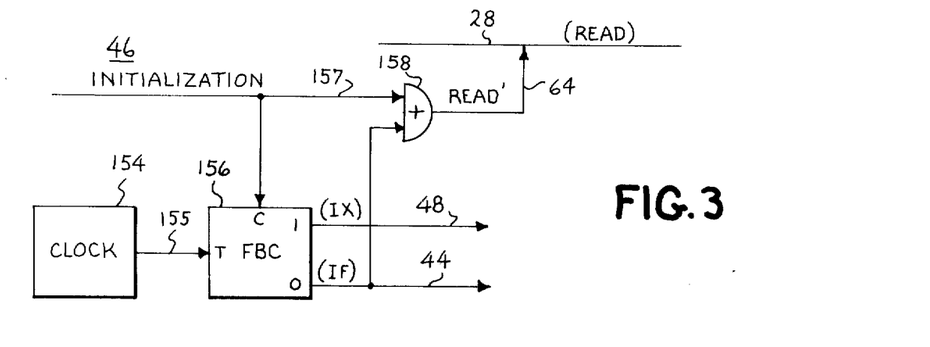
FIG. 3 is a block diagram of sequence timing and control logic of FIG. 1.
Figure 4:
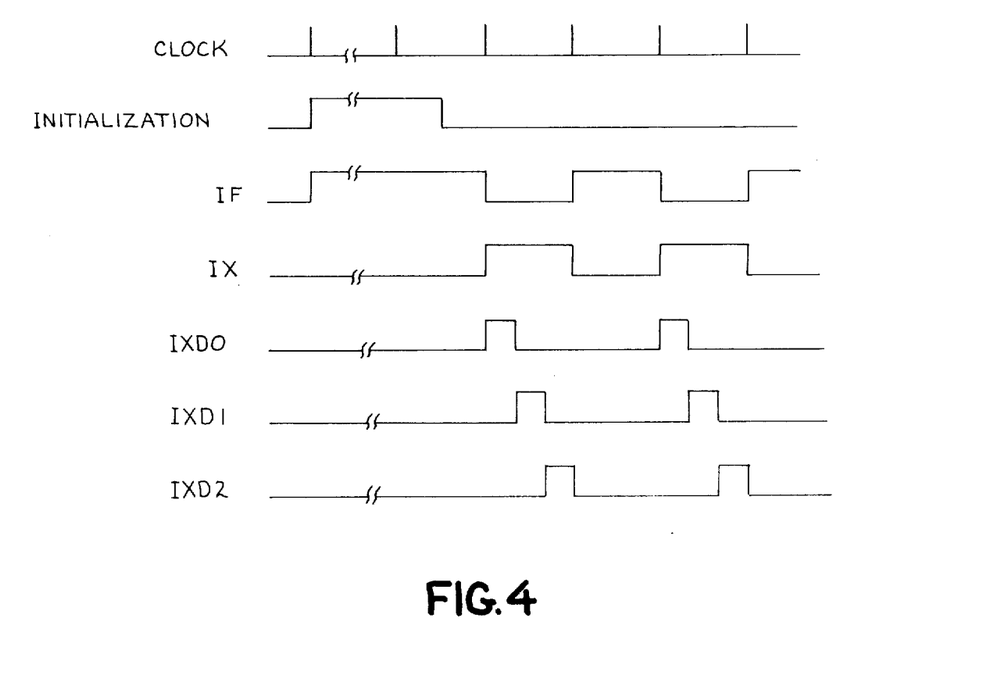
FIG. 4 is a timing diagram useful in understanding the operation of the invention.

The detailed logic of the sequence control logic 46 and the operation control logic 30 of FIG. 1 will now be explained. Reference is made to FIGS. 3 and 4 wherein FIG. 3 illustrates in block diagram form the sequence control logic 46 which makes up the basic timing logic for the present invention and FIG. 4 shows a timing diagram of the signals generated by the timing logic 46.

FIG. 4 also illustrates timing signals generated by the operation control logic 30. The sequence logic 46 is comprised of a clock generator 154 for generating a series of output clock pulses on line 155 shown as a clock shown shown in FIG. 4. These clock signals are provided to a trigger or T input terminal of an FBC flip-flop 156 which toggles in response to the clock signals. Additionally, the flip-flop 156 receives an initialization input signal on line 157 to a C or clear terminal which, during system initialization, causes the flip-flop 156 to achieve a reset state generating a binary 1 output signal (IF) on conductor 44 as shown in FIG. 4. As can be seen in FIG. 4 so long as the initialization signal is present at the C input terminal of flip-flop 156, that flip-flop will remain in the reset state until the initialization signal is removed. It is during the initialization period of the system that the first instruction is retrieved from the store 16 of FIG. 1 by the presence of the (IF) and initialization signals at the inputs of OR gate 158. OR gate 158 generates a Read output signal on conductors 64 and 28 to apply the Read signal to the control of store 16. Subsequent to initalization all Read signals on conductor 28 will be applied to the control of store 16 from the operation control logic 30. The generation of the Read signal on conductor 28 will subsequently be described.

Still referring to FIG. 4 it can be seen that as soon as the initalization signal on line 157 is removed from flip-flop 156 that that flip-flop resets on the first clock pulse following the removal of that signal. Simultaneously, with the resetting of flip-flop 156, the (IX) signal on conductors 48 and 49 (FIG. 1) goes to a binary 1. It is during this pulse period of the (IX) signal that the instruction is executed by the system of FIG. 1. Correlating FIGS. 1 and 3 it can be seen now how the (IX) and (IF) signals on lines 48 and 44 respectively are applied to the various switch and logic blocks of FIG. 1. Additionally, it will be noted that the (IX) signal is applied on conductor 49 to the operation control logic 30 for controlling timing operations therein to be subsequently described.

Figure 5A:
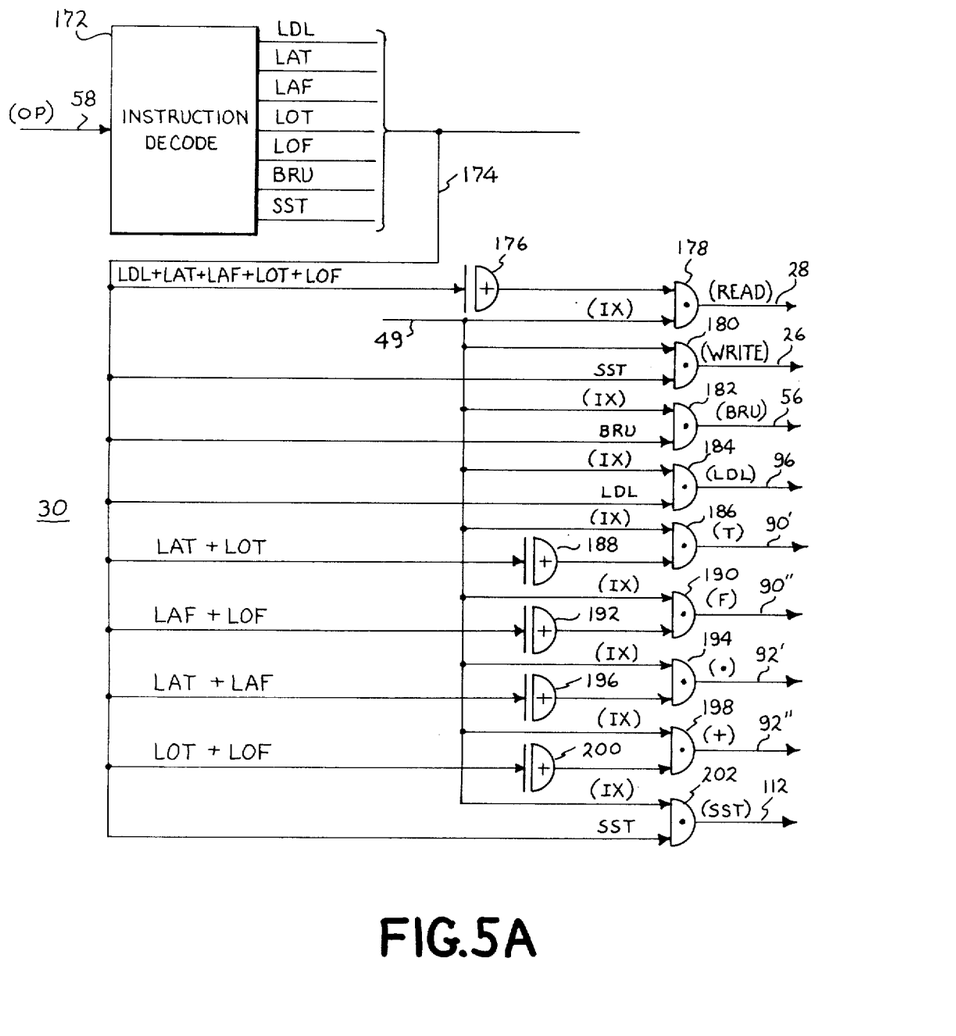
FIGS. 5A and 5B are detailed block diagrams of operation control logic of FIG. 1.
Figure 5B:
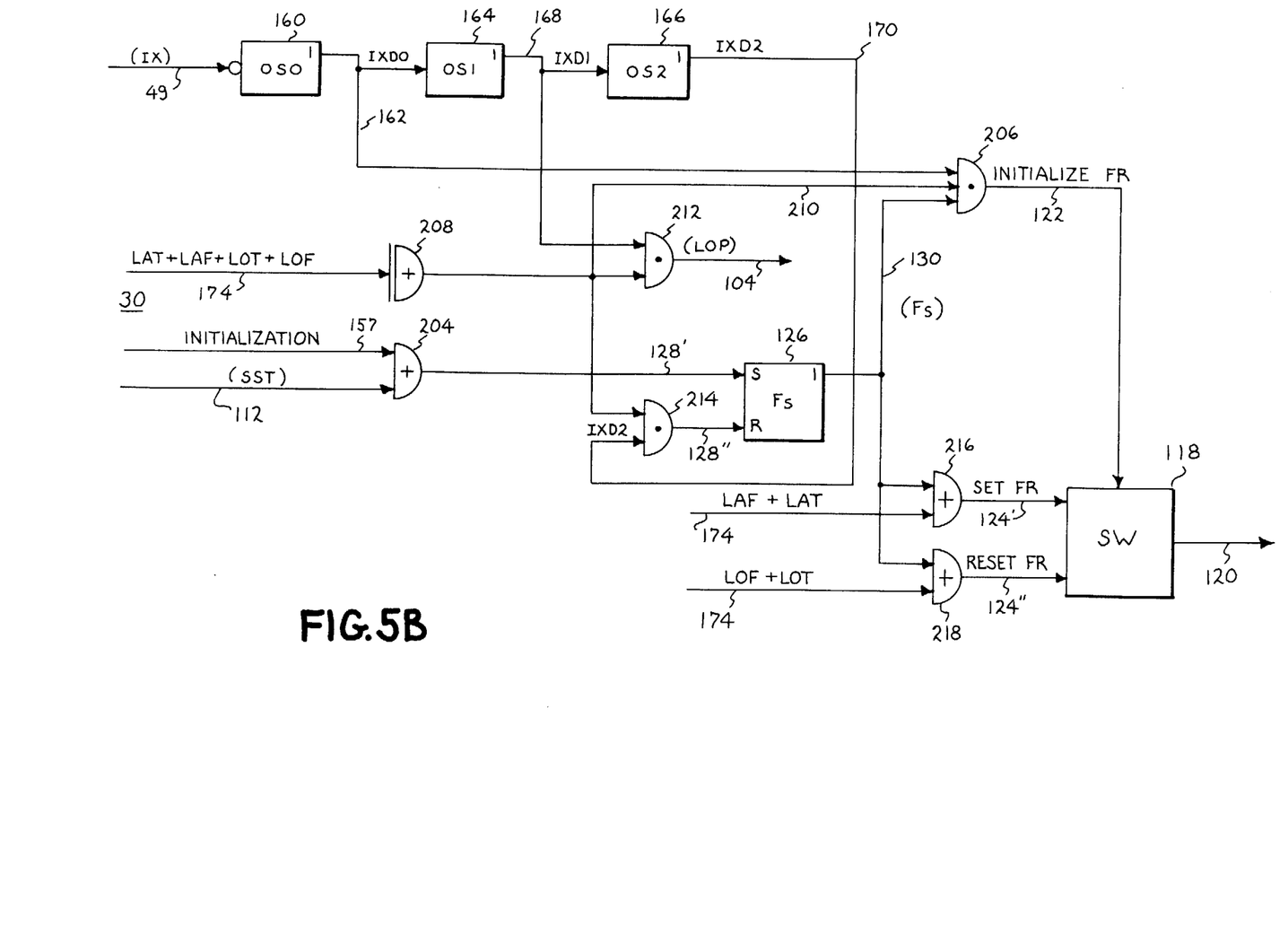

Reference is now made to FIGS. 5A and 5B which show in detail the logic of the operation control logic 30. Reference is first made to FIG. 5B, a portion of which shows how three timing signals shown in FIG. 4 as IXD0, IXD1, and IXD2 are generated in the operation control logic 30 in response to the (IX) signal on line 49 from the sequence control logic 46.

The (IX) signal is applied on line 49 to a first one shot multi-vibrator or delay means 160. As can be seen in FIG. 4 multi-vibrator 160 generates the output signal IXD0 on conductor 162. The IXD0 signal is applied to the input of a second one shot multi-vibrator 164, causing that multi-vibrator to generate the IXD1 signal in response to the trailing edge of the IXD0 signal. The IXD1 signal is applied to a third one shot multi-vibrator 166 on conductor 168. Multi-vibrator 166 responds to the trailing edge of the IXD1 signal generating the IXD2 signal on a conductor 170. The three signals (IXD0, IXD1 and IXD2) are instruction execution delay signals for controlling timing operations in the operation control logic 30.

Reference is now made to FIG. 5A of the operation control logic 30. FIG. 5A shows an instruction decode 172 which is a standard decode logic and may be comprised of transistors, diodes or the like for decoding operation code signals representative of the op codes of instructions from the instruction register 54 of FIG. 1 as applied thereto on conductors 58. The instruction decode 172 in response to the various op codes selectively generates a plurality of instruction decode signals LDL, LAT, LAF, LOT, LOF, BRU, and SST. The instruction decode signals are provided on a plurality of conductors 174 to various AND and OR gates in the operation control logic to generate the control signals as briefly described in FIG. 1. All of the output signals from the operation control logic 30 are shown in FIGS. 5A and 5B.

Referring specifically to FIG. 5A, whenever the instruction decode decodes either an LDL, LAT, LAF, LOT, or LOF instruction an OR gate 176 is enabled in response to a signal corresponding to one of those instructions to enable an AND gate 178 when that AND gate receives the (IX) signal on conductor 49. The Read signal on line 28 as previously described is generated by AND gate 178 and applied to the control of store 16, thus effecting the retrieval of information from the store. When an SST instruction is decoded by the instruction decode 172 and AND gate 180 is enabled with the presence of the (IX) signal to generate the write signal on conductor 26 for application to the control of store 16.

In a similar fashion, an AND gate 182 is enabled by a BRU instruction signal on one of the conductors 174 from the instruction decode 172. The (BRU) signal on conductor 56 is applied to switch 50 (FIG. 1) when AND gate 182 is enabled by the (IX) signal. An AND gate 184 generates the (LDL) signal on conductor 96 which is applied to switch 94 in response to the decoding of an LDL instruction and when the (IX) signal is applied to that gate. The previously mentioned (T) or true signal is generated on a conductor 90', which is one of the conductors 90 of FIG. 1, whenever an AND gate 186 is enabled in response to the (IX) signal and a one of the signals LAT or LOT from an OR gate 188. In a similar fashion an AND gate 190 generates the (F) or false signal on conductor 90" when enabled by the (IX) signal and a one of the signals LAF or LOF via on OR gate 192. Two other signals (.) and (+) are generated as AND and OR function signals respectively in response to the decoding of the LAT, LAF, LOT and LOF signals. The AND function signal (.) is generated from an AND gate 194 in response to the IX signal and a one of the LAT or LAF signals via an OR gate 196. Similarly the OR function signal (+) is generated by an AND gate 198 which is enabled in response to the (IX) signal and a one of the LOT or LOF signals from an OR gate 200 as decoded by the instruction decode 172. Additionally, the (SST) signal, as previously described in connection with FIG. 1, is generated on line 112 by an AND gate 202 when that AND gate receives the (IX) signal and an SST signal as decoded by the instruction decode 172. Referring to FIG. 1 it can be seen how each of the signals just described in connection with FIG. 5A are connected into the logic of FIG. 1.

Reference is now made to FIG. 5B to an OR gate 204 receiving the initialization signal on line 157 and the (SST) signal on line 112. Whever the initialization signal is applied to the system, OR gate 204 is enabled to apply a set signal via one of the conductors 128 designated as 128' to a set terminal (S) of the $F_S$ flip-flop 126. In a similar fashion, whenever the system is operating and an SST instruction is decoded by the instruction decode 172 of FIG. 5A, the (SST) instruction signal enables OR gate 204 to set flip-flop 126. Whenever flip-flop 126 is set, its one terminal 1 generates a binary 1 signal (FS) on conductor 130 as previously described in connection with FIG. 1. The (FS) signal is applied to an AND gate 206. AND gate 206 also receives an input signal from an OR gate 208, the latter being enabled in response to a one of the signals LAT, LAF, LOT, or LOF, applied thereto on conductors 174 from FIG. 5A. Whenever OR gate 208 is enabled a binary 1 output signal from that gate on line 210 is applied to AND gate 206. The third and last input to AND gate 206 is the IXD0 signal on conductor 162. Coincidence of the three input signals to AND gate 206 effects the generation of the Initialize $F_R$ signal on conductor 122 which is applied to switch 118 duplicated in FIG. 5B for simplicity.

Reference is now made back to the output of OR gate 208. OR gate 208 is also connected to the input of an AND gate 212. A second input to AND 212 is the IXD1 signal on conductor 168. The coincidence of the two input signals to AND gate 212 effects the generation of the previously mentioned (LOP) signal on conductor 104 which is applied to switch 102 of FIG. 1. Additionally, the output of OR gate 208 is applied as one input to an AND gate 214 also receiving the IXD2 signal on conductor 170. When AND gate 214 is enabled, the $F_S$ flip-flop 126 is reset, thus disabling AND gate 206.

The output of flip-flop 126 is also applied to two AND gates 216 and 218. AND gate 216 receives two additional input signals LAF and LAT on conductors 174 from FIG. 5A and AND gate 218 receives two additional input signals LOF and LOT on conductors 174. The output of these two AND gates are shown as set $F_R$ on conductor 124' and reset $F_R$ on conductor 124" of conductors 124 of FIG. 1. These latter two signals are applied to switch 118 which is enabled by the Initialize $F_R$ signal on conductor 122 to cause that switch to provide the proper output signals on conductors 120 to the OR junction 106 of FIG. 1. It is the output signals from switch 118 on lines 120 which initialize the $F_R$ flip-flop 82 during either system initialization or upon the execution of the first LOP instruction in a logic string.

Figure 2:
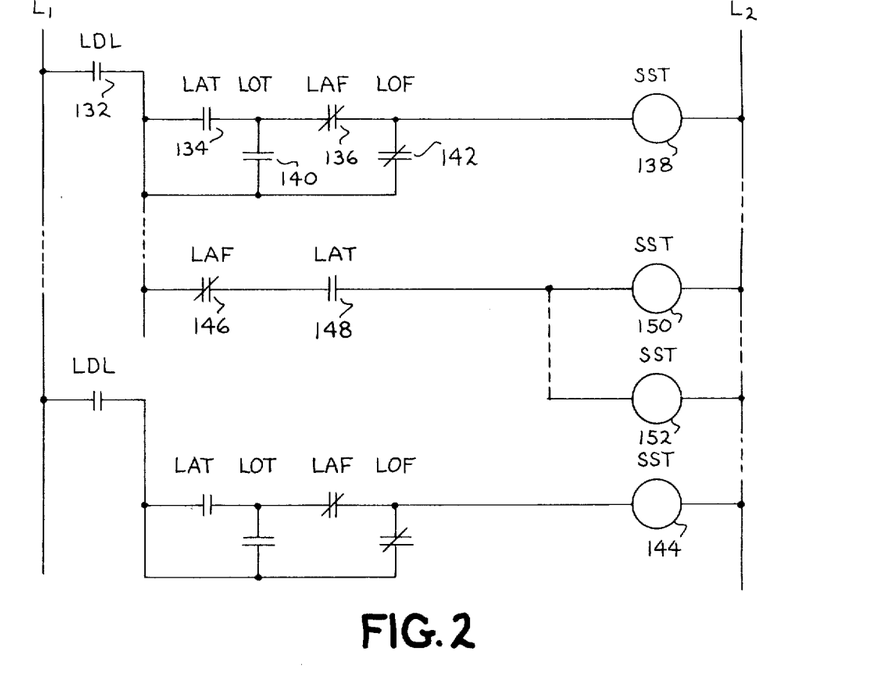
FIG. 2 is a schematic showing an electrical ladder diagram having a format of an electrical control circuit which is simulated by the computer controller system of FIG. 1.

Prior to proceeding with a detailed description of the operation of the invention, reference is made to FIG. 2 which illustrates an electrical ladder type diagram to be simulated by the control program of the processor of the present invention. The diagram of FIG. 2 is comprised of two vertical buses L1 and L2 wherein the bus L1 may be considered to be a left-hand bus and L2 a right-hand bus. Each of these buses is connected to the terminals of a power source not shown. Each of the strings of logic include a plurality of logic elements shown as normally open or normally closed relay contacts and each string of logic terminates in a relay having one end connected to the logic string and the other end connected to the bus L2. Since each string of logic functions in basically the same manner, only the top logic string will be explained. As previously mentioned, a common permissive contact or switch in the present invention may be simulated by the program to control a plurality of strings of logic. This permissive contact is shown in the top left of FIG. 2 as a contact 132 designated LDL. The contacts in the logic string in FIG. 2 are specified by a mnemonic designation of a particular type of command to be stored in the data processor store and executed in the control program. These mnemonic designations are LDL, LAT, LOT, LAF, and LOF. Coils are designated by the mnemonic SST.

The designation LDL above the permissive contact stands for "load L" or "load to the left bus flip-flop $F_L$." The LAT designation stand for an operation code in one of the control words of the program meaning "logic AND true." The LAF designation stands for "logic AND false." As can be seen in FIG. 2, if the LDL contact 132, a LAT contact 134, and a LAF contact 136 are all closed, continuity is established between L1 and L2 to energize a relay coil SST 138. The logic string also includes two parallel connected contacts LOT 140 and LOF 142. The LOT contact 140 is in parallel with the LAT contact 134 and the LOF contact 142 is in parallel with the series combination of LOT contact 140 and LAF contact 136. The designation LOT stands for "logic OR true" and the designation LOF stands for "logic OR false." As can be seen, the LOT and LOF contacts allow the incorporation of OR functions within the program. For example, if LDL 132 is closed and LOF 142 is closed, SST 138 will be energized. Similarly, if LDL 132 is closed and LOT 140 is closed with LOF 142 open, SST 138 will be energized because of continuity established through normally closed LAF contact 136.

Programming of the computer utilizing a command structure of the type shown in FIG. 2 is a relatively simple matter since the commands may be stored in the store directly from observation of the drawing of FIG. 2. For example, to place the simulative logic in the store, it is merely necessary to store the appropriate commands at selected or desired locations in the store. The data processor of the present invention is designed to sequentially execute the instructions in any given series or series parallel logic network to simulate that logic network. Therefore, the commands may be placed in the selected locations in store in a series configuration. Starting at some predetermined location the commands utilized in the program are LDL, LAT, LOT, LAF, LOF and SST.

Since the commands LDL, LAT, LOT, LAF, LOF and SST are logic operators for performing logical functions to simulate circuit conditions they will be collectively referred to as logic operators or LOPs.

It should be pointed out, in that it is not shown in FIG. 2, that each of the above commands is placed in the store in a word which includes an address which references a controlling status condition or a simulated relay which controls the status or condition of that relay contact (command). For example, the simulated control relay or status condition for controlling LAT contact 134 in the upper logic string might be a relay coil 144 in the lower logic string as shown in FIG. 2. Since relay coil 144 does control the LAT contact, the LAT command when placed in store would contain an address referencing the location of the relay coil 144 in store. Additionally, any one of the relay contacts LDL, LAT, LOT, etc. may contain an address which references an input status condition in store as provided to the data processor from the external equipment. In this latter situation, the input status condition may be representative of a condition external to the data processor or it may be representative of a relay coil external to the data processor which may operate the simulated relay contact in the data processor memory.

As previously mentioned, LDL contact 132 is common to a plurality of strings of logic. A great deal of store or memory space is saved by the use of the common LDL contact 132. This is possible because when writing the control program, the LDL command need only be used once for each string or plurality of strings of logic which commonly share the LDL contact. For example, when writing the program for the two upper strings of logic in FIG. 2, the LDL command for contact 132 would first be written. Then the other commands, LAT, LOT, LAF, LOF and SST for contacts 134, 140, 136, 142 and relay coil 138, respectively, would be written in that order. Then immediately following the last SST 138 the commands LAF, LAT and two SSTs to contacts 146, 148 and coils 150 and 152 respectively. When the program is placed in the store the LDL command 132 is placed at some predetermined location and all other commands follow in consecutively numbered store locations.

Reference is now made to the relay coils in each of the strings which are designated SST (Store Status Command). The Store Status Command is used in the control program of the present invention to store a status condition or in final condition of the contacts in a given string of logic. The SST command defines the end of any given string of logic. Thus, it can be seen that the length of the string is indefinite and theoretically limited only by the size of the available memory or store. When the SST command is executed in the data processor, its operation code effects the storing of an accumulated status condition to a location in store as specified by the address field of the SST command. When the data processor of the present invention is being utilized to control external equipment the address field of the SST command will effect the storing of a final result of a given string of logic to a location in the store. This final result will subsequently be transferred from the store through the scanner 12 (FIG. 1) to the external equipment to control the latter. However, the SST command provides an extended usage of the status or final result information in certain applications where it is desirable to use the status of a given string of logic to effect internal operations within the data processor. Referring to the middle logic string of FIG. 2, it will be noted that it contains a plurality of SST functions each representitive of a simulated relay coil or condition. This indicates that any number of SST commands may immediately follow in sequence a string of logic. Each SST command may contain a different store address; thus, as each SST command is executed the final status condition of the related or associated logic string will be stored in a specific blt location in the store. In this manner it is possible to use the status of any given string of logic as many times as desired and in as many places as desired in the program.

The operation of the invention will now be described by referring to FIGS. 1 and 2 in combination. Let it be assumed that the data processor store contains a control program corresponding to the upper logic string as shown in FIG. 2. Also, assume that the status portion of the store 16 contains a plurality of status conditions representative of either relays controlling associated ones of the contacts in the string or representative of input status conditions provided to the store from the external equipment via the scanner 12. Let it also be assumed that power has been applied to the data processor (FIG. 1) generating an initialization signal (not shown) which is applied to the various logic blocks within the data processor to initialize various storage units, the registers, the flip-flops, etc. The operation of the data processor consists of two basic cycles: an instruction fetch or retrieve cycle and an instruction execution cycle. It is well-known in the art that all data processors which function in this manner require various timing signals which control the sequencing of the various operations within each of the cycles.

During the ensuing description reference should be made to FIGS. 3, 4, 5A and 5B to see how the various timing and control signals are developed and used. The address present in the procedure address register 42 may be an address to any location in the store. For simplicity, let it be assumed that address is to location zero in the procedure portion of the store 16.

To start the execution of the control program the sequence control logic 46 first generates a control signal (IF) which is applied to switch 38 to enable that switch to pass the address from the procedure address register to the control portion of the store 16. Simultaneously with the generation of (IF), the sequence control logic provides a Read' signal via conductors 64 and 28 to the control portion of the store. Thus, the data processor store is instructed to read the first addressed location which contains a LDL instruction or command. The (IF) timing signal is also applied to switch 68 thus enabling that switch to transfer the LDL command into the instruction register 54. The LDL command is now in the instruction register and provides operation code output signals via conductors 58 to the operation control logic 30 and an address to the input of switch 40 via conductors 62. During the instruction execution cycle the sequence control logic generates a timing signal (IX) which is simultaneously applied to switch 72, the operation of control logic 30 and as a count input signal to the procedure address register 42. The (IX) signal causes the procedure address register to be incremented by one thus providing the next succeeding higher address for addressing the store on the next instruction fetch cycle.

The instruction register now contains, in its operation code portion, the LDL instruction to thus provide signals to the operation control logic which are decoded to generate a Read signal via conductor 28 from the control portion of the store. Simultaneously, the address from the instruction register is transferred through switch 40 in response to the (IX) timing signal. Thus, the store is addressed to retrieve a status condition representative of the permissive left bus contact 132. This condition or bit is transferred through switch 72 in response to the (IX) timing signal and is provided to the input of switch 94 via conductor 78 and 100. At this time the operation control logic 30 is generating as an output control signal LDL on conductor 96 to switch 94. The LDL signal is generated in response to the decoding of the operation code signals, from the instruction register, in the operation control logic. In response to the LDL signal the status condition bit from the store will be transferred to either set or reset the $F_L$ flip-flop.

The LDL command has now been executed and the sequence control logic generates the next (IF) timing signal. The store is now addressed at the next location in the manner previously described to retrieve the LAT command (LAT 134) from the addressed location. The LAT command is placed in the instruction register via switch 68 in the same manner as was the LDL command. The operation code portion of the LAT command is now decoded by the operation control logic. Further, the referencing address in the address portion of the instruction register is now provided to the store control via switch 40. In response to the LAT operation code the operation control logic now generates a read signal via conductor 28 to the control of the store causing the status of the addressed bit or simulated relay to be transferred via switch 72 to the R logic 76 by way of conductor 78. The R logic also receives a major data or status input signal from the $F_R$ flip-flop 82 via conductor 84. The purpose of this data input will be subsequentially described. The particular operation to be performed by the R logic 76 is determined by the signals on control lines 90 and 92 coming from the operation control logic designated, respectively, as (T/F) and (·/+). The signals on these control lines are derived from the operation control logic and determine the logic equations used in the R logic to produce an output signal on conductors 80 for transfer through switch 102 to the $F_R$ flip-flop 82, thus establishing the status or cumulative condition of the contact now being compared.

The logic expressions for the R logic for developing an R term for the several LOP commands are as follows:

$LOF = (F_R) + [(\overline{S_B}) \cdot (F_L)]$
$LOT = (F_R) + [(S_B) \cdot (F_L)]$
$LAF = (F_R) \cdot [(\overline{S_B}) \cdot (F_L)]$
$LAT = (F_R) \cdot [(S_B) \cdot (F_L)]$ In the above expressions the parentheses around each of the terms is used to indicate the contents of that term. For example, $(F_R)$ means the contents of the $F_R$ flip-flop. The term $(S_B)$ is utilized to indicate the status bit presently being retrieved from the store and compared in the R logic with the contents of the $F_L$ and $F_R$ flip-flops as directed by the particular type of logic operator.

With the status bit of the first string of logic shown in FIG. 2 now accumulated in $F_R$ the data processor store is again addressed to retrieve the second operation control word LOT. This control word is executed in the same manner as just described for the LAT command whereby the instruction register provides the operation code signals to the operation control logic which in turn generates a Read signal to the store control to retrieve a particular status bit or reference control relay from an address location as specified by the address in the instruction register. Again, the R logic will generate a proper output status condition for transfer into the $F_R$ flip-flop in response to the LOT command as determined by the signals (T/F) and (·/+) on conductors 90 and 92, and the previous contents of the $F_R$ and $F_L$ flip-flops. The data processor will continue executing, in sequence, the illustrated instructions at the logic string as shown in FIG. 2; the next instructions being the execution of the LAF instruction representative of a normally closed relay contact and then the execution of the LOF instruction representative of a normally closed contact. As can be seen in FIG. 2, the SST command is utilized to define the termination or the end of a particular logic string. After the execution of the LOF command, the procedure address register contains the address of the location for the SST command. The store control is now addressed by the procedure address to retrieve the SST command. When the SST command is in the instruction register, its operation code portion is decoded by the operation control logic 30 which generates a write control signal on line 26 of the store control. The instruction register also presents an address via conductors 62, switch 40 and conductors 36 and 32 to the store control for addressing a specified bit location in the store for the storage of the $F_R$ status condition or accumulated bit.

Switch 108 of FIG. 1 receives two inputs, the output of the $F_R$ flip-flop 82 and a signal (SST) on line 112 from the operation control logic. The operation control logic decodes SST operation code and generates the (SST) signal which enables switch 108 to gate the contents of the $F_R$ flip-flop through switch 116, which is enabled by the signal (IX) into the store at the location specified by the address in the instruction register. It should be pointed out that the execution of the SST command does not cause the operation control logic to generate any signals which will affect the contents of the $F_R$ flip-flop.

The proper operation of the R logic depends upon the correct recognition of logic string boundaries or the terminations of each of the strings of logic. As shown in FIG. 1 and 5B, the string satisfied or $F_S$ flip-flop 126 is used as the medium for determining these boundaries. As described at the beginning of this discussion, the $F_S$ flip-flop was set upon initial application of power to the processor. $F_S$ is also set by a signal Set $F_S$ from the operation control logic when it decodes the operation code of an SST command. The $F_S$ flip-flop is reset by the operation control logic upon the execution of any of the LAT, LOT, LAF and LOF commands. The only timing requirement in resetting $F_S$ is that it be reset at a time late enough in the execution cycle of the command so that its contents do not affect the operation of the $F_R$ flip-flop. Thus, it can be seen that the $F_S$ flip-flop will always be placed in the set condition upon the termination of any logic string by the execution of an SST command. Since the last command executed in a logic string as shown in FIG. 2 is an SST, the $F_S$ flip-flop is in the set state at the beginning of the execution of the next logic string.

From the above equations for the R logic, the R bit or $F_R$ flip-flop is controlled to assume a prescribed state in accordance with the previous contents of the $F_R$ flip-flop. The state of this flip-flop must be established prior to the execution of a plurality of commands in any given string so that the final accumulated condition of $F_R$ will be the proper condition upon the termination of the string. The state of $F_R$ is controlled via switch 118 which receives signals Set/Reset $F_R$ (FIG. 5B) from the operation control logic 30 and the signal initialize $F_R$ on conductor 122 representative of the LOP commands as decoded by the operation control logic. The input signals to switch 118 from the operation control logic on conductors 122 and 124 are functions of the instructions of LAF, LAT, LOF, or LOT, and the state of the $F_S$ flip-flop. The equations for establishing the proper condition of the $F_R$ flip-flop upon entry into any given string of logic are as follows:

$F_R = F_S \cdot (LAF + LAT)$
$\overline{F_R} = F_S \cdot (LOF + LOT)$

Thus, it can be seen that $F_R$ will either be set or reset in accordance with the particular logic operation to be performed on entry into each string of logic (See FIG. 5B).

It will be recalled that the previously listed equations for the R logic each incorporate the $F_L$ term thus, indicating that the LDL status bit must be in the closed condition in order to energize or set the final status condition of $F_R$ to a one condition upon the execution of the SST at the termination of each string. Thus, it can be seen that after $F_R$ has been placed in a predetermined state for the beginning of each string the state of $F_L$ then becomes important in controlling further conditions of the state of $F_R$. In other words, when the first LDL instruction is executed in any given string of logic, if the LDL status contact is in the open state, the relay terminating at the end of the string will never be energized. It is this function which allows the permissive LDL contact to act as a master control for all associated logic strings to simultaneously operate upon a plurality of various devices within an external process; for example, to shut the process down in the event of a serious malfunction.

Still referring to FIG. 2, assume that the final SST command in the middle logic string has just been executed. The next command immediately following will be the LDL beginning in the bottom logic string. The processor will then again sequentially execute each of the LOP commands within this string in the described manner. Also assume that the SST command in the bottom logic string is the end of the simulated electrical ladder diagram in the procedure portion of the store. Since it is necessary to return to the starting address of the first LDL command in the control program, a mechanism is required to effect this return. This mechanism is implemented by the use of a branch command such as a branch unconditional BRU command which is the last word in the control program. After the last SST command is executed, the procedure address register will address the next sequential location which contains this BRU command. The BRU command is retrieved from the store and placed in the instruction register in the manner as described for all previous instructions. In this situation, however, the operation control logic will decode the BRU operation code and provide a BRU signal via line 56 to switch 50. Switch 50 also receives the address as specifically by the BRU instruction from the instruction register 54 via lines 60. In this manner the (BRU) control signal from the operation control logic causes the branch address of the control program to be parallel loaded into the procedure address register 42.

From the preceding description, it is seen that the data processor of the present invention in combination with the R logic for accumulating the results of a plurality of logic operations and with the permissive contact logic ($F_L$ flip-flop) provides a means and a method of performing Boolean logic operations to simulate any type of logic control function using these types of Boolean logic functions. For example, the relay contacts as shown in FIG. 2 could represent a plurality of AND and OR gate elements of the well-known type connected in a series-parallel logic configuration to perform the same functions as shown in FIG. 2 and the terminating relay coil or the status condition at the end of each string of logic could be representative of a flip-flop or storage means for storing the status of the string of logic.

While the principles of the invention have now been made clear in the preferred embodiment, there will be immediately obvious to those skilled in the art many modifications of structure, arrangement, porportions, the elements, materials, and components used in the practice of the invention and otherwise which are particularly adapted for specific environments and operating requirements without departing from those principles. The appended claims are, therefore, intended to cover and embrace all such modifications within the limits only of the true scope of the invention.

What is claimed is:

1. An improved programmable controller for controlling equipment, simulating a control circuit having sequenced opening and closing of electrical switches, said controller comprising:
    a. a store having located therein a plurality of first and second type information items,
        1. each of said first type information items having an operation code portion identifying one of a prescribed number of types of logic operations and logic conditions, and further including an address portion identifying a location in said store containing an input logic condition, the state of which specifies the status of the logic condition identified by the first type information items representing a logic string, and
        2. each of said second type information items identifying the end of a logic string and a location in said store;
    b. a variable state accumulator
    c. means to successively access said store to retrieve said information items;
    d. means to initialize said accumulator in accordance with the type of logic operation identified by the first accessed information item of the represented logic string;
    e. means responsive to the operation code portion of a then accessed information item of the first type, the state of the input logic condition identified by said then accessed information item and the then existing state of said accumulator to establish a new state of said accumulator; and,
    f. means responsive to a second type of information item to store the then existing state of said accumulator at a location identified by said second type of information item as an output logic condition serving to develop a control signal to be provided from said controller to said equipment.

2. An improved programmable controller for controlling equipment, simulating a control circuit having sequenced opening and closing of electric switches, said controller comprising:
    a. a store having first and second portions, the first portion containing a plurality of first and second type information item and the second portion capable of containing input and output bits of states which represent, respectively, the conditions of switch elements in said equipment and the conditions of control signals to be provided from said controller to said equipment,
        1. one or more of said first type information items representing a logic string of electrical switch elements forming a simulated control circuit, each of said first type information items having an operation code portion identifying one of a prescribed number of types of logic operations and logic conditions representative of the states of the electrical switch elements forming the simulated control circuit and further including an address portion identifying a location in the second portion of said store containing an input status bit, the state of which specifies the status of the logic condition of the switch element identified by the first type information item, and
        2. each of said second type information items identifying the end of a logic string of electrical switch elements and a location of an output status bit in the second portion of said store;
    b. a variable state accumulator;
    c. means to successively access said store to retrieve said information items;

d. means to establish an initial state of said accumulator in accordance with the type of logic operation identified by the first accessed information item of the represented logic string of electrical switch elements, e. means responsive to the operation code portion of a then accessed information item of the first type, the state of the input status bit identified by said then accessed information item and the then existing stat of said accumulator to establish a new state of said accumulator; and, f. means responsive to a second type of information item to store the then existing state of said accumulator, as an output status bit, at a location in the second portion of said store as identified by said latter information item, serving to develop a control signal to be provided from said controller to said equipment.

3. An improved programmable controller for controlling equipment, simulating a control circuit having sequenced opening and closing of electrical switches, said controller comprising:

a. a store having located therein a plurality of first and second type instructions, 1. said first type instructions being sequentially located in said store and collectively representing a logic circuit comprised of a plurality of types of logic statements of a predetermined format, each of said first type instructions having an operation code portion identifying one of the plurality of types of logic statements and a true or false logic condition for that logic statement, and further including an address portion identifying a location in said store containing a previously stored input status bit from said devices, the state of which specifies the status of the logic condition identified by the first type instruction, and 2. each of said type instructions identifying the end of a logic circuit and a location in said store b. an accumulator for storing logic states;

c. means to successively access said store to retrieve said instruction;

d. means to establish an initial logic state of said accumulator in accordance with the type of logic statement identified by the first accessed instruction of a represented logic circuit;

e. means reesponive to the operation code portion of a then accessed instruction of the first type, the state of the input status bit identified by said then accesssed instruction and the then existing logic state of said accumulator to establish a new logic state of said accumulator; and, f. means responsive to a second type of instruction to store the then existing logic state of said accumulator at a location identified by said latter insruction as an output status bit serving to develop a control signal to be provided from said controller to said devices.

4. An improved programmable controller for controlling equipment, simulating a control circuit having sequenced opening and closing of electrical switches, said controller comprising:

a. a store for containing a program simulating an electrical circuit or ladder type diagram format of the type having a plurality of circuit conductors, each circuit conductor terminating in a relay coil operated in accordance with the status of continuity of the circuit conductor, each circuit conductor including at least one of a plurality of types of electrical elements forming an electrical circuit of switches, the conditions of which determine the status of continuity of the circuit conductor, each of said electrical elements being represented in said program by a plurality of first type instructions, each identifying one of the plurality of types of electrical elements and further identifying a location in said store containing a previously stored input status bit from said equipment, and each relay coil being represented by a second type instruction identifying the end of an electrical circuit and specifying a location in said store;

b. means to successively access said store to retrieve said instructions;

c. a variable state accumulator;

d. means to initialize said accumulator in accordance with the type of electrical element identified by the first accessed instruction of the simulated electrical circuit;

e. means for establishing a new state of said accumulator in accordance with the type of electrical element identified by a then accessed instruction of the first type, the state of the status bit identified by said then accessed instruction and the then existing state of said accumulater; and, f. means responsive to a second type instruction to store the then existing logic state of said accumulator at a location identified by said latter instruction as an output status bit serving to develop a control signal to be provided from said controller to said equipment.

5. A method of controlling equipment by a programmable controller simulating a control circuit having sequenced opening and closing of electrical switches, the method comprising:

a. storing in the memory of a computer a simulated control circuit comprised of a plurality of first and second type instructions, 1. said first type instructions being sequentially located in said memory and collectively representing said control circuit, each of said first type instructions having an operation code portion identifying one of a prescribed number of types of switch elements having a specified logic condition, and further including an address portion identifying a location in said memory containing an input status bit to said computer from said equipment, the state of which specifies the condition of the type of switch element identified by the first type instruction; and 2. each of said second type instructions identifying the end of said control circuit and a location in said memory;

b. successively accessing said memory to retrieve said instructions;

c. establishing an initial status condition of an accumulator in accordance with the type of switch element identified by the first accessed instruction of said simulated control circuit;

d. repetitively updating said initial status condition of said accumulator in accordance with the operation code portion of a then accessed instruction of the first type, the state of the input status bit identified by said then accessed instruction, and the then existing condition of the accumulator to derive a final accumulator status condition representative of the logic conditions of the switch elements of said control circuit; and, e. storing the final accumulator status condition at a location in said memory identified by a second type of instruction as an output status bit serving to develop a control signal to be provided from said computer to said equipment.

6. A method of controlling equipment by a programmable controller simulating a control circuit having sequenced opening and closing of electrical switches, the method comprising:

a. storing in the memory a computer, instructions of first, second and third types forming a program for simulating a ladder diagram circuit of the type having a plurality of conductors, a permissive contact connected in common to said plurality of conductors represented by a first type of instruction identifying the beginning of the simulated ladder diagram circuit and identifying a location in said memory of a first status condition, the state of which controls the conducting status of said plurality of conductors, each of said plurality of conductors having connected therein at least one of a plurality of types of relay contacts, each represented by a one of said second type instructions, said second type instructions being sequentially located in said memory following a first type of instruction and each identifying a type and a condition of a relay contact and further identifying a location in said memory containing an input status bit provided to said computer from said equipment, the state of which specifies the condition of the type of relay contact identified by the second type instruction, and each conductor terminating in a relay having a condition determined by the conducting status of the conductor, the relay being represented by an instruction of the third type identifying the end of a conductor and a location in said memory;

b. successively accessing said memory to retrieve said instructions;

c. storing the condition of a permissive contact in accordance with the state of the first status condition identified by the first accessed instruction of said simulated ladder diagram circuit;

d. establishing a second status condition in accordance with the type of relay contact identified by the first accessed instruction with the second type;

e. repetitively updating said second status condition in accordance with the condition of the permissive contact, the then existing condition of the second status condition, and the state of the input status bit and the type and condition of the relay contact identified by the then accessed instruction of the second type to accumulate a final condition representative of the conducting status of a one of the plurality of conductors; and, f. storing the final status condition at a location in said memory identified by a third type of instruction as an output status bit serving to develop a control signal to be provided from said computer to said equipment.

7. A method of controlling equipment by a programmable controller simulating a control circuit having sequenced opening and closing of electrical switches, the method comprising:

a. storing in the memory of a computer, instructions of first, second, and third types forming a program for simulating a ladder diagram circuit of the type having a plurality of conductors, a permissive contact connected in common to said plurality of conductors represented by a first type instruction identifying the beginning of the simulated ladder diagram circuit and identifying a location in said memory of a first status condition, the state of which controls the conducting status of said plurality of conductors, each of said plurality of conductors having connected therein at least one of a plurality of types of relay contacts, each represented by a one of said second type instructions, said second type instructions being sequentially located in said memory following a first type instruction and each identifying a type and condition of a relay contact and further identifying a location in said memory containing an input status bit provided to said computer from said equipment, the state of which specifies the condition of the type of relay contact identified by the second type instruction, and each conductor terminating in a relay having a condition determined by the conducting status of the conductor, the relay being represented by an instruction of the third type identifying the end of a conductor and a location in said memory;

b. successively accessing said memory to retrieve said instructions;

c. storing the condition of a permissive contact in accordance with the state of the first status condition identified by the first accessed instruction of said simulated ladder diagram circuit;

d. establishing a second status condition in accordance with the type of relay contact identified by the first accessed instruction of the second type;

e. repetitively updating said second status condition in accordance with the condition of the permissive contact, the then existing condition of the second status condition, and the state of the input status bit and the type and condition of the relay contact identified by the then accessed instruction of the second type to accumulate a final status condition representative of the conducting status of a one of the plurality of conductors;

f. storing the final status condition at a location in said memory identified by a third type of instruction as an output status bit serving to develop a control signal to be provided from said computer to said equipment; and, g. repeating the steps of establishing the second status condition, repetitively updating the second status condition and storing the final status condition until the final status condition for each of the plurality of conductors has been stored.

8. An improved programmable controller for controlling equipment, simulating a control circuit having sequenced opening and closing of electrical switches, said controller comprising:

a. a store having located therein a plurality of first, second and third information items, 1. each of said first type information items identifying the beginning of a plurality of logic strings and each identifying a location in said store containing a first status bit, common to said plurality of logic strings, the state of said first status bit affecting the status of said plurality;

2. said second information items collectively representing a plurality of logic strings and each having an operation code portion identifying one of a prescribed number of types of logic operations and logic conditions and further including an address portion identifying a location in said store containing a second status bit, the state of which specifies the status of the logic condition identified by the second type information item, and 3. each of said third type information items identifying the end of a logic string and a location in said store;

b. a variable state accumulator;

c. means to successively access said store to retrieve said information items;

d. storage means responsive to each of said first type information items for storing the state of the first status bit identified thereby;

e. means to initialize said accumulator in accordance with the type of logic operation identified by the first accessed information item of the second type;

f. means responsive to the state of the status bit stored in said storage means, the operation code portion of the then accessed information item of the second type, the state of the second status bit identified by said then accessed information item and the then existing state of said accumulator; and, g. means responsive to a third type information item to store the then existing state of said accumulator at a location identified by said latter information item, as an output status bit serving to develop a control signal to be provided from said controller to said equipment.

* * * * *